C. C. NICHOLS & W. H. WRIGHT.
ELECTRIC LIGHT AND POWER SYSTEM.
APPLICATION FILED FEB. 6, 1914.

1,175,554.

Patented Mar. 14, 1916.
2 SHEETS—SHEET 2.

Witnesses:—
Richard Sommer
Thos Macarthur

Inventors
Charles C. Nichols
William H. Wright
by A. J. Sawyer
Attorney

UNITED STATES PATENT OFFICE.

CHARLES C. NICHOLS AND WILLIAM H. WRIGHT, OF BUFFALO, NEW YORK, ASSIGNORS TO NICHOLS & WRIGHT MOTOR CO., OF BUFFALO, NEW YORK, A CORPORATION OF NEW YORK.

ELECTRIC LIGHT AND POWER SYSTEM.

1,175,554.  Specification of Letters Patent.  Patented Mar. 14, 1916.

Application filed February 6, 1914. Serial No. 816,950.

*To all whom it may concern:*

Be it known that we, CHARLES C. NICHOLS and WILLIAM H. WRIGHT, citizens of the United States, residing at Buffalo, in the county of Erie and State of New York, have invented new and useful Improvements in Electric Light and Power Systems, of which the following is a specification.

Our invention relates to electric light and power systems.

More particularly it relates to systems employing a gas-engine, a generator of electric energy and a storage battery, wherein the energy of the engine may be used directly as mechanical energy, or converted into electric energy and used directly from the generator, or converted and stored for future independent or supplemental use.

Our invention relates also to improvements in light and power systems which render the operations automatic, as hereafter more fully shown; and it relates, furthermore, to novel devices and combinations which make possible the construction of an electric light and power plant as a portable mechanical unit,—as a single, complete, automatic machine, as distinguished from an installation for light or power comprising separate machines and consequent separate supervision and control.

The object of our invention is to combine the energies of a gas-engine, an electric generator and an electric storage battery in such a manner that we may use the energy of the gas-engine and generator directly for light or power; or store the energy of gas-engine and generator for future use; or employ these two utilities at the same time, storing all energy above that required for immediate use; or use the stored energy for light or power independently of the gas-engine; or use the gas-engine entirely separately or independently of the generator or storage battery.

Further objects are to render these several functions and operations automatic where such interaction is desirable; and to produce an electric light or power system which is portable and which may be constructed, assembled and shipped from a factory the same as any other unit machine, reducing the factor of installation to nothing more than connecting the gas-engine with a fuel supply and the line wires with the electrical apparatus to be operated.

Other objects of our invention will appear from the following specification.

Figure 1:
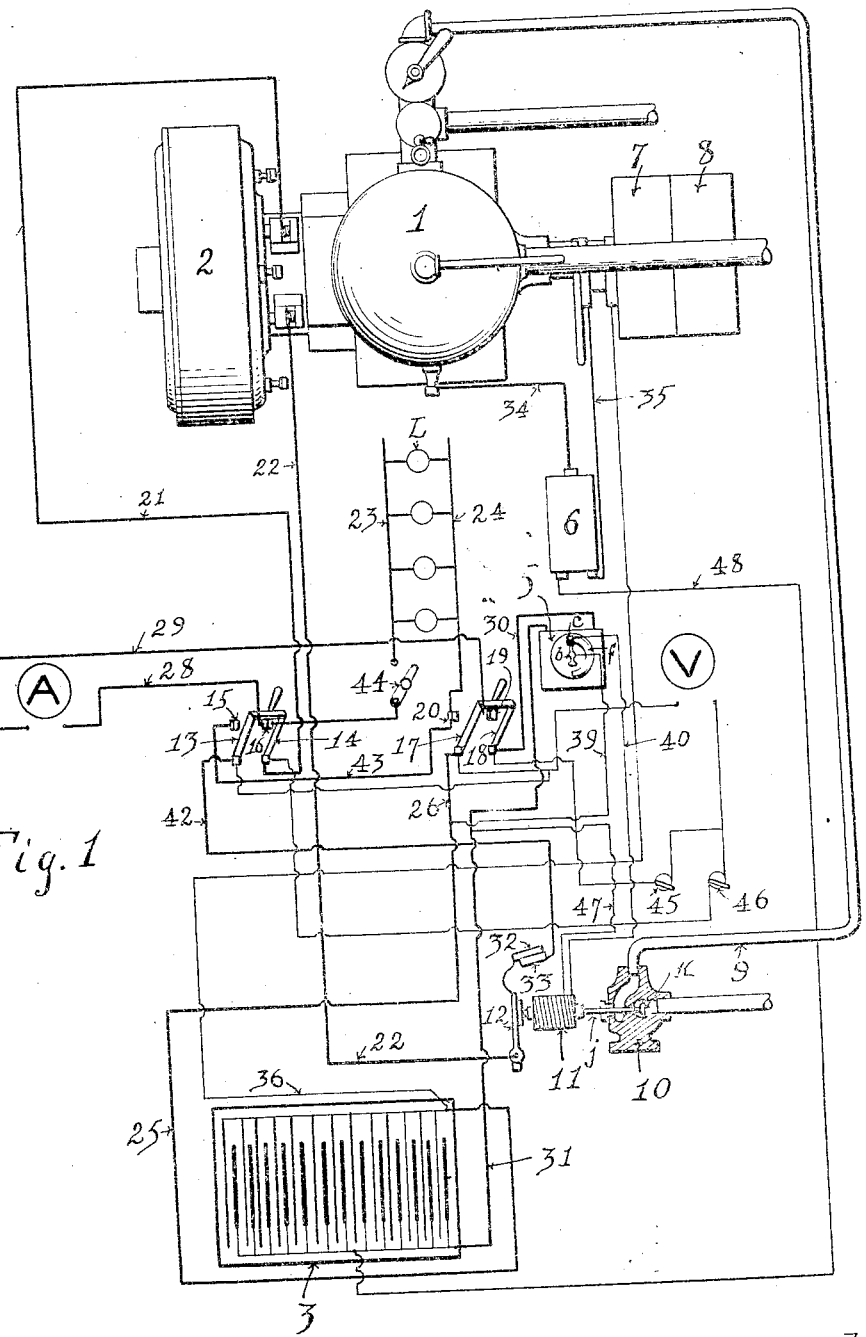
Figure 2:
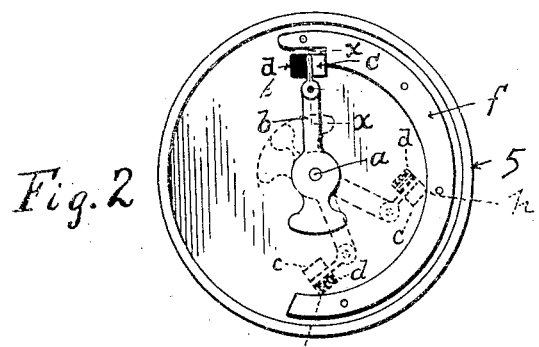
Figure 3:
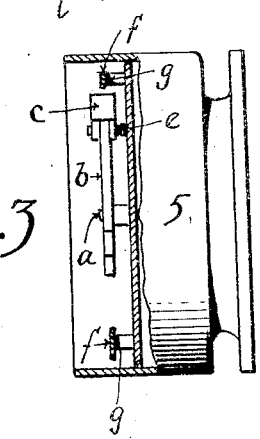
Figure 4:
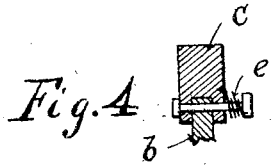
Figure 5:
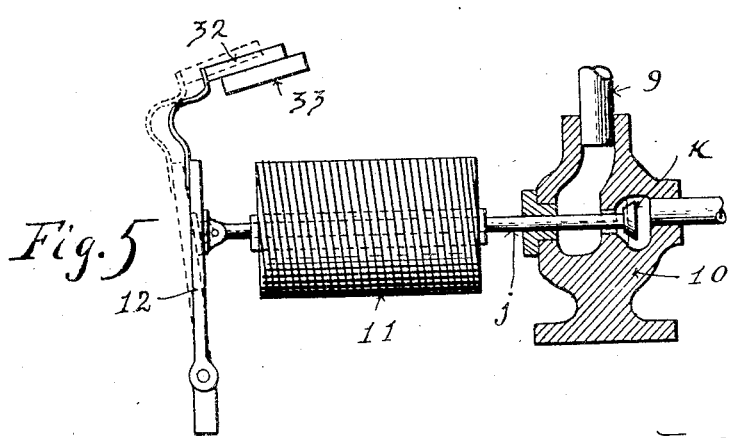

Referring to the drawings herewith,—Figure 1 is a diagrammatic view of our invention. Fig. 2 is a detail face view of the circuit-controlling attachment to our ammeter. Fig. 3 is a side elevation, partly in section of our ammeter showing the manner of mounting the contact and sector, as hereafter described. Fig. 4 is a section on the line $x$—$x$ of Fig. 2. Fig. 5 is an enlarged detail view of our fuel controlling device and the electric switch operated in conjunction therewith.

The mechanical apparatus employed embraces the following: A gas-engine 1 of any desired type; an electric generator-motor 2; a storage battery 3; a circuit controlling ampere hour meter 5, hereafter described; a spark-coil 6; a fixed pulley 7 and an idler 8 for belt driving any desired machinery; a fuel valve 10 and a magnet 11 governing the same; and electric switches 13—14, 17—18, and 44. We have also shown an ampere meter A, a volt meter V, and switches 45 and 46 for governing the said meters; but these are not essentials to our invention. It will be seen that these several devices are all standard and well known, with the exception of the circuit-controlling ammeter and the fuel-controlling device. These we will now describe.

Rigidly mounted upon the pointer mandrel $a$ of a standard ampere hour meter 5, and in place of the pointer, is a counterbalanced arm $b$. This arm $b$ has pivoted to its end a contact member $c$ for making and breaking an electric circuit, which member $c$ we shall hereafter term the pivoted contact. This pivoted contact upon one face has an electrical conductor and upon its opposite face has an insulating surface $d$. It is held normally in alinement with the arm $b$ by a spring $e$, one end of which is secured to said pivoted contact and the other to the bolt or screw which constitutes the pivot upon which it may turn. Thus the pivoted contact may be turned upon its pivot against its spring sufficiently to present either its conducting surface or its non-conducting surface; but when the pressure is removed it will assume its normal position in line with the arm $b$. A segment $f$ is mounted over the face-plate of the ampere hour meter and insulated therefrom by insulating pieces $g$ and lies in the plane of rotation of the arm $b$. The inner edge of this segment $f$ is eccentric to the axis of the arm $b$, so that, as the arm $b$ swings from the zero position, the contact presses less hard upon the segment to conform to the reduction in torque of the ampere hour meter with increase of load. When the arm $b$ is in the zero position the pivoted contact $c$, shown in full lines in Fig. 2, is in electrical connection with the segment $f$ and remains so in connection while moving from zero to maximum. Its position while moving from zero to maximum load is shown in broken outline at $h$ in Fig. 2. When maximum is reached (and both maximum and minimum load may be arbitrarily determined by the length and position of the segment $f$) the pivoted contact $c$ swings to normal position under compulsion of its spring and electrical connection therethrough is broken. As the arm $b$ returns toward zero the insulating piece $d$ bears against the segment $f$, as clearly shown in broken outline in Fig. 2 at the point $i$ on the segment $f$. Consequently the electrical connection will remain broken until the battery pressure falls to the established minimum, will be reëstablished at that point and will remain established until maximum is again reached.

Referring now especially to Fig. 5, 10 is a fuel valve which permits fuel to pass through the pipe 9 to the carbureter of the gas-engine. The stem $j$ of this valve is connected to the armature 12. When the solenoid 11 is not energized the flow of fuel will seat the valve $k$ and push the armature 12 away from the core of the solenoid 11. The contact 32 is spring-mounted upon the armature 12 and is capable of making electrical connection with the contact 33. When the armature 12 is pushed away from the core of the solenoid 11, as just described, electrical connection between the contacts 32 and 33 will be broken, and when the solenoid 11 is energized electrical connection will be established, and at the same time the fuel valve will be opened. It will be understood, of course, that, where the fuel-flow is insufficient to produce closing of the valve $k$, and consequent separation of the contacts 32 and 33, a spring may be attached to the armature 12 to insure such action.

The operation of the system will be understood from a description of the following functions: Let it be assumed that the gas-engine 1 is at rest and that the charge of the storage battery 3 has fallen to minimum, so that the pivoted contact $c$ has made electrical connection with the segment $f$ as shown in Fig. 2. Under these conditions a circuit including the battery 3 and the solenoid 11 is established, so that current flows from battery 3 through wires 25, 39, pivoted contact $c$, segment $f$, wire 40, solenoid 11, wires 47 and 31 back to battery. This energizes the solenoid 11, opening the valve 10 and putting the contacts 32 and 33 in electrical connection. If, now, the switches 13—14 and 17—18 be closed and the switch 44 is open, current will flow from battery 3 through wire 25 and 26, switch-arm 17, contact 20, wire 43, contact 15, switch-arm 13, wire 42, contacts 33 and 32, armature 12, wire 22, through motor 2, wire 21, switch-arm 14, contact 16, wire 28, ampere meter A, wire 29, contact 19, switch-arm 18, wire 30, through coil of ampere hour meter 5 and wire 31 back to battery. This will energize the generator-motor 2, causing it to act as a motor; and causing it, in turn, to start the engine 1, charging its cylinder with fuel. At the proper moment the commutator on the engine will establish the spark-coil circuit as follows: from battery 3 through wire 36, commutator of engine, wire 35, spark-coil 6 and wire 48 back to battery. This causes spark current to be carried to the spark-plug of the engine through wire 34, and thus the charge in the engine is ignited and the engine begins action. As soon as the engine is thus started the generator-motor 2 will immediately generate a current of higher pressure than that which caused it to act as a motor, and will thus charge the battery 3.

It will thus be seen that the engine is not only self-starting and self-stopping, but is absolutely automatic when the switches 13—14 and 17—18 are closed; so that, at any time when the battery charge is being used, either for light or power, and falls to the established minimum, the engine will be started automatically and the battery charged to maximum, when the breaking of electrical connection between the pivoted contact $c$ and the segment $f$ will disestablish the connection between the contacts 32 and 33 by the closing of the valve $k$. The electric light circuit, or the circuit which supplies electric energy to other uses, is as follows: When the switches 17—18 and 44 are closed, current flows from battery 3 through wire 25 to switch-arm 17, contact 20, line wire 24 to line wire 23 through switch 44 to contact 16, wire 28, ampere meter A, wire 29, contact 19, switch-arm 18, wire 30 through ampere hour meter 5 and wire 31 back to battery. It is to be observed that current will flow through this path also (if the switch 44 is closed) while the battery is being charged as above described.

If it is desired to generate electric energy and use it independently of the storage battery 3, all that is necessary to do is to permit the battery charge to fall below the maximum so that the contacts 32 and 33 will be in electrical connection and the valve 10 open, as above described, start the gas-engine, as above described, close the switch 44 and open the switch 17—18. Current will then flow from generator 2 through wire 22, armature 12, contacts 32 and 33, wire 42, switch-arm 13, contact 15, wire 43, contact 20, line wires 24 and 23 through switch 44 to contact 16, switch-arm 14 and wire 21 back to the other pole of the generator. It will also be observed that if, when the gas-engine and generator are running as just described, the switch 17—18 being open and the battery 3 under maximum, the gas-engine may be run without generator load and used to drive the pulley 7 and the machinery belted thereto.

The purpose of employing the ampere meter A and the volt meter V is simply to enable the operator to know the battery load at any time. By closing the switch 45 a shunt including the volt meter may be established and the meter read, and by closing the switch 46 both ampere meter and volt meter may be read. But we would have it understood, as above stated, that the use of these meters is a matter of convenience, and not of necessity, to our invention.

Having thus described our invention, we claim:

In an electric light and power system, in combination with a gas-engine, generator and storage battery, a light and power circuit, a generator circuit, a device in said light and power circuit for automatically governing a switch in said generator circuit comprising an ampere hour meter having an arm rotated thereby, a pivoted contact on said arm having one contacting face a conductor and the other contacting face a nonconductor, a segment against which said pivoted contact bears with its conducting face in traveling toward maximum and with its nonconducting face in traveling toward minimum charge, a solenoid, a circuit connecting said pivoted contact and said segment with the battery through said solenoid, an armature governed by said solenoid, an electric switch in said generator circuit governed by said solenoid and its armature and means for controlling the fuel supply to said gas-engine comprising a fuel valve and a valve stem on said valve connected to and governed by said armature.

In testimony that we claim the foregoing invention, we have hereunto set our hands in the presence of two witnesses.

CHARLES C. NICHOLS.
WILLIAM H. WRIGHT.

Witnesses:
D. H. HARPER,
L. A. DEUTHER.